United States Patent [19]
Madl, Jr.

[11] Patent Number: 5,329,739
[45] Date of Patent: Jul. 19, 1994

[54] AIR IMPERVIOUS FILTER SUPPORT SYSTEM

[76] Inventor: Jos. Madl, Jr., 2161 Vista Entrada, Newport Beach, Calif. 92660

[21] Appl. No.: 670,266

[22] Filed: Mar. 14, 1991

[51] Int. Cl.$^5$ .......................... E04B 9/06; B01D 46/00
[52] U.S. Cl. ................................ 52/506.06; 52/762; 52/768
[58] Field of Search ................. 52/483, 484, 488, 489, 52/475, 476, 761, 762, 768, 263, 510, 511, 512, 513; 248/317, 324; 454/187; 55/355, 484

[56] References Cited

U.S. PATENT DOCUMENTS

| | | | |
|---|---|---|---|
| 982,015 | 1/1911 | Olsen | 52/489 X |
| 1,308,083 | 7/1919 | Lachman | 52/475 |
| 1,673,630 | 6/1928 | Madge | 52/512 |
| 1,695,973 | 12/1928 | Olsson | 52/489 X |
| 1,723,621 | 8/1929 | Jewell | 52/512 |
| 2,382,456 | 8/1945 | Urbain | 52/475 |
| 2,671,538 | 3/1954 | Horowitz et al. | 52/483 X |
| 3,450,427 | 6/1969 | Fischer | 52/513 |
| 3,486,311 | 12/1969 | Allan, Jr. | 454/187 X |
| 4,279,109 | 7/1981 | Madl, Jr. | |
| 4,678,487 | 7/1987 | Cadwell, Jr. et al. | 52/484 X |
| 4,683,699 | 8/1987 | Larsson | 52/484 X |
| 4,946,484 | 8/1990 | Monson et al. | 52/484 X |
| 4,986,050 | 1/1991 | Brunetti et al. | 55/355 X |
| 5,072,557 | 12/1991 | Naka et al. | 52/263 X |

FOREIGN PATENT DOCUMENTS

| | | | |
|---|---|---|---|
| 2456522 | 8/1976 | Fed. Rep. of Germany | 52/488 |
| 2018340 | 10/1979 | United Kingdom | 52/512 |

OTHER PUBLICATIONS

Flanders Product Data Sheet by Flanders Filters, Inc.
Ultra-Lok Clean Room Ceiling Grid System brochure by Donaldson Company, Inc.
Snap-Seal Fluid Seal Ceiling Sytem for Clean Rooms Sales Information and Standard Price Sheet by Filtra Corporation.
Five (5) sheets of drawings for the Cam-Gel Ceiling Framing System by Cambridge Filter Corporation.

*Primary Examiner*—Carl D. Friedman
*Assistant Examiner*—Robert J. Canfield
*Attorney, Agent, or Firm*—Knobbe, Martens, Olson & Bear

[57] ABSTRACT

A ceiling of filter panels is supported by support rods that extend through corner intersection of adjacent panels, and by a supporting disk secured to the lower end of the rods to support the corners of the filter panels. The disk has a notch in it that mates with the filter corner so that with the disk rotated to a position wherein the notch is aligned with the panel corner, a panel may be installed or removed from the assembly. Once a panel is in position, the disk is rotated about 45° to a position wherein it supports a portion of the corner of each filter panel at that intersection. Retracted pins in the support disk are then threaded further into the disk so that the pins extend into an aligned hole in the corner of each panel at that intersection to align the panels. Sealing strips carrying sealing gel are then positioned around the periphery of the panels to span the gap between adjacent panels, with the strips being supported by the edges of the panels. Also, a sealing cap, together with sealing gel, extends over the support disks and the ends of the sealing strips to provide a suitable air seal at the intersection. Also disclosed is a vertical filter wall of panels spaced and supported in a manner similar to the horizontal filter.

38 Claims, 6 Drawing Sheets

AIR IMPERVIOUS FILTER SUPPORT SYSTEM

FIELD OF THE INVENTION

This invention relates to air filter support systems, particularly in connection with "clean rooms" and other such facilities wherein the number of particles in the air must be minimized.

BACKGROUND OF THE INVENTION

In research and manufacturing facilities, there are an ever increasing number of situations in which the number of particles in the air must be kept within specified limitations. Generally, this is accomplished by utilizing air filters having the necessary characteristics to capture the particles.

In one common approach, a layer of flat filters is suspended from a room ceiling, with the filters extending over the entire room area. Typically, air is conducted downwardly from a plenum through the ceiling filters, into the room and then returned back to the plenum by way of outlets in the room floor or the lower portion of the walls. A common way to support the panels is to create a grid of supporting elements which engage the entire peripheral frame of each filter panel. In addition, it is necessary to have an air sealing gasket or sealing gel positioned between the grid elements and the filter panel frames.

It is desirable to improve and simplify the currently used filter support systems.

SUMMARY OF THE INVENTION

Briefly stated, the present invention comprises a system for supporting filter panels utilizing spaced support members that are positioned beneath the corners of panels that meet at an intersection. Each support member, preferably in the form of a disk, is connected by a fastener to a rod suspended from an overhead ceiling or other support. The filter panels are sufficiently rigid along their peripheries to be self-supporting when supported at their corners. In a preferred form of the invention, a lock pin extends through the disk and into each of the panels at that intersection, thus ensuring that each panel is precisely positioned.

To seal the gaps between adjacent filter panels, there are providing sealing strips which are positioned beneath and span the gap between adjacent panels. These strips are supported by spaced screws that extend into retainers that can be inserted between and supported by adjacent panels. To provide further sealing, a sealing gel is applied to the sealing strip before it is fastened in position. Preferably, the sealing strip has a continuous channel into which the sealing gel is positioned. Also, the frame on each panel is preferably formed with one or more depending ribs that project into the gel to further enhance the seal at that location.

The disks are preferably rotatably connected and each includes a pie-shaped sector shaped to fit the corner of one filter panel. Thus, with the disk at each corner of a particular filter panel, rotated so that its sector is aligned with a panel corner, a panel may be inserted or removed from the plane of the filter panels without disturbing any of the adjacent panels. Once a particular filter panel is inserted into the common plane of the filter panels, the disk is rotated to a lock position wherein the pie-shaped sector is positioned beneath portions of adjacent panels whereby the disk supports those two adjacent panels, as well as the other panels at that intersection. The lock pins are retracted when a disk is to be rotated, and repositioned when the disk is returned to its full support position.

The invention further comprises a cap which extends over the supporting disks and the intersections between the support disks and the ends of the sealing strips which terminate at that supporting disk. Sealing gel is placed on the cap before it is installed. The cap is secured in position by the gel and by a suitable fastener.

The invention further includes a specialized tool for installing or removing the disk cap. The tool is provided with a plurality of fingers which grip edges of the cap and spread upwardly extending leg portions of the cap to permit it to be precisely centered under the disk and fit onto the adjacent ends of the sealing strips. The tool can then be manipulated to release the cap.

While the invention is primarily described in relation to an overhead filter arrangement suspended by a ceiling, a vertical wall of filter panels can be supported in similar fashion, except that the supporting disks and lock pins would be receiving loads on their sides.

DETAILED DESCRIPTION OF THE PREFERRED EMBODIMENT

Figure 1:
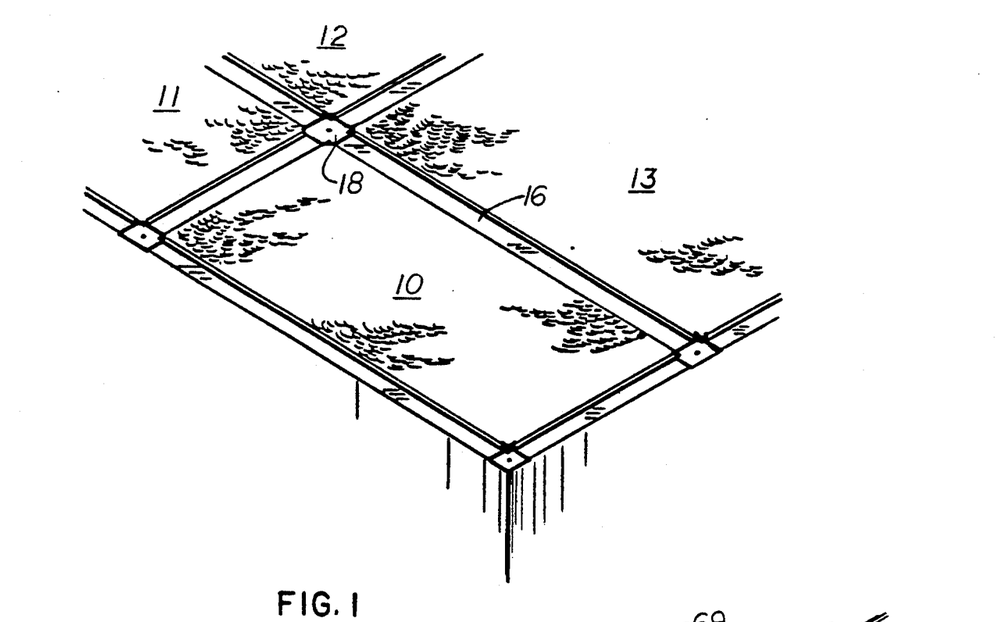
FIG. 1 is a perspective view of a ceiling filter arrangement in accordance with the invention.

Referring to FIG. 1, there is illustrated a portion of an overhead filter system, including a plurality of rectangular filter panels, one of which is completely shown at 10 and portions of three others 11, 12 and 13 are shown. The filter panels are generally flat, containing the amount of thickness required to obtain the desired filtering action and sufficient strength to maintain its integrity with only edge support.

With panels joined in a series there are air gaps between the panels, and these gaps are covered by sealing strips 16 and by caps 18 located at the intersection of the sealing strips.

Figure 3:
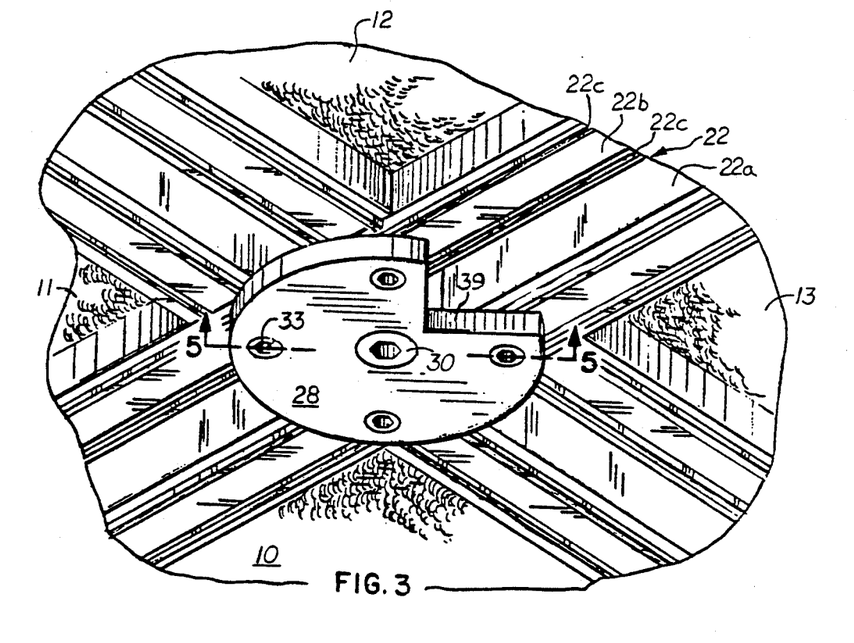
FIG. 3 is an enlarged perspective view of a portion of the filter arrangement of FIG. 1 illustrating a supporting disk of the invention located at the intersection of four filter panels, with the disk locked in its supporting position.

FIG. 3 shows the intersection of panels 10–13 in greater detail. As can be seen from FIGS. 5 and 6, each panel has a rectangular frame 22 having an interior vertical side wall 22a and a horizontal lower wall 22b with a pair of spaced parallel ribs 22c depending from the lower surface 22b. The ribs 22c have generally rectangular cross sections, as seen in FIG. 6, and are spaced from the side edges of the horizontal wall 22b. In addition, the frame elements 22 include a short vertically extending wall 22d which is spaced outwardly from the vertical wall 22a. A gap 24 extends between the frames of adjacent filter panels.

Figure 4:
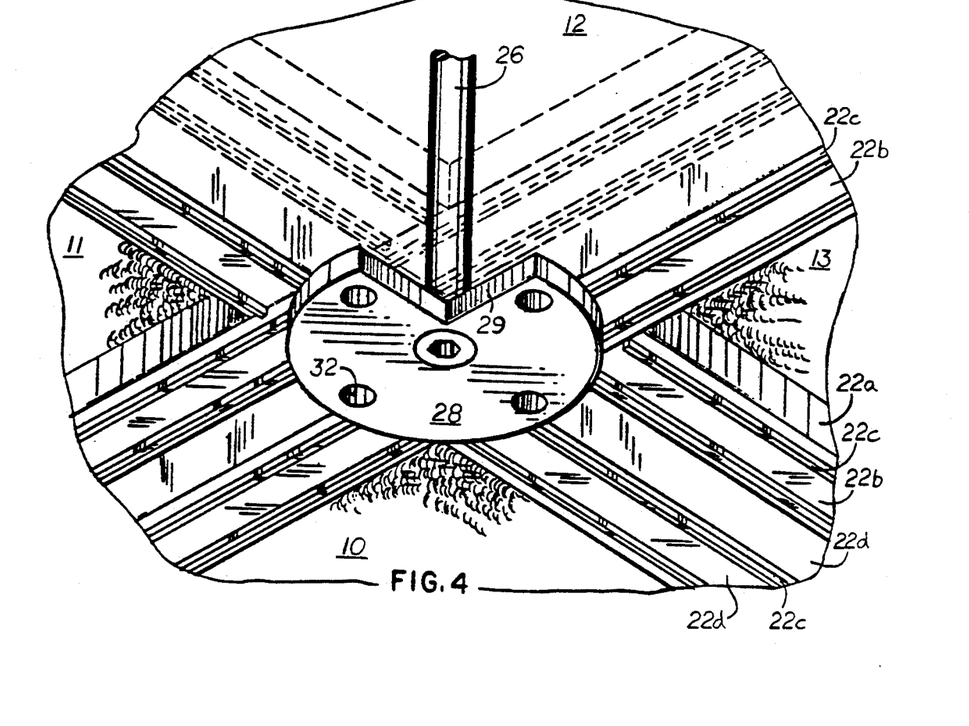
FIG. 4 is a perspective view similar to FIG. 3, but with the support disk rotated to a position where a filter panel can be inserted or removed.
Figure 5:
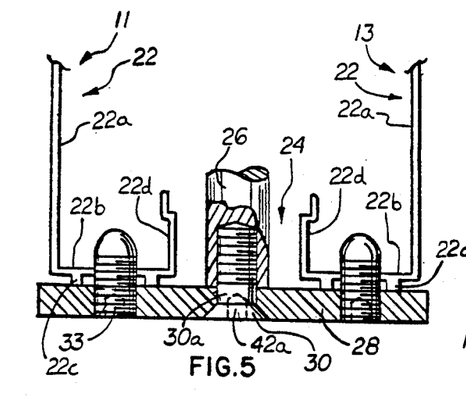
FIG. 5 is a cross-sectional view on line 5—5 of FIG. 3, illustrating locking pins in position for two adjacent filter frames across the supporting disk.
Figure 6:
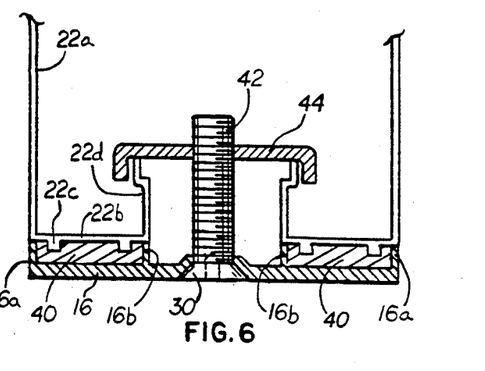
FIG. 6 is a cross-sectional view illustrating the air sealing arrangement between adjacent panels at a location spaced from the intersection.

At the intersection of each four panels, there is positioned a vertically extending support rod 26 shown in FIGS. 4 and 5. A circular support disk 28 is shown in FIGS. 3, 4 and 5, secured to the lower end of the vertical support rod 26 by suitable means such as a centrally located fastener which threads into the lower end of the support rod 26. The disk is rotatably mounted on the lower unthreaded portion 31a of the fastener shank. The thread on the fastener may be suitably peened so that the fastener will not inadvertently rotate but will instead stay in a selected position. Thus, the disk can rotate on the unthreaded portion of the fastener relatively easily without causing the fastener to rotate. The fastener end engages the end of the threaded socket in the end of the rod 26 so that the disk can be oriented relatively easily if not under load.

At each corner of each frame 22, there is provided a precisely located hole between the ribs 22c, and the disk 28 is formed with four threaded holes 32 (FIG. 4) which are precisely aligned with the panel holes when the disk is properly rotatably oriented, as shown in FIG. 3. With the holes aligned, threaded positioning pins 33 are threaded into the supporting disk and entered into the respective corners of the panels at that intersection, as seen in FIGS. 3 and 5.

Each disk 28 is provided with a generally pie-shaped cutout, or notch 29. The edges of the notch form approximately a 90° angle, but the center of the notch does not extend completely to the center of the disk, as seen in FIGS. 3 and 4. Four equally spaced positioning holes 32 are formed in the disk with the notch 29 being located between two of the holes. With the disk positioned as shown in FIG. 3, all four of the panels at that intersection are supported on their corners, and each panel receives its positioning pin 33, as may be seen from FIGS. 3 and 5.

With the pins retracted out of the panel, the disk can be rotated to be oriented as seen in FIG. 4. The corner of the panel 12 shown in dotted lines is not supported because its corner fits within the pie-shaped notch 29. Accordingly, when a panel is to be positioned into an otherwise assembled array of panels, the panels are placed into position by way of the notch. It should be understood that a similar supporting disk is at each corner of the panel, with the disk at each corner oriented so that its notch is aligned with a corner of the panel to be installed. Once a panel is mounted, the disk can be rotated to a full support position. In the same manner, when a panel is to be removed, the disk is rotated so the notch is aligned with the corner of the panel to be removed. When an array of panels is first being assembled, the disk may be initially placed in the full support position, and adjacent support rods simply moved aside slightly to permit progressive installation of the panels. This approach also permits the alignment pins to be fully installed in the disks and the disks properly oriented to receive the panel holes, before the panels are moved into position.

As noted above, sealing strips 16 cover the gaps between adjacent filters to restrict air flow in that area. FIG. 6 illustrates a cross-sectional view of two adjacent filter panels with the sealing strip spanning the gap and extending onto the frame 22 of each panel. The sealing strip cross section includes a pair of stub walls 16a and 16b on each side of the strip, with each pair of walls forming a shallow U-shaped channel. The walls 16a and 16b are spaced and located to be aligned with the frame walls 22a and 22b of each frame. The height of the walls 16a and 16b is greater than the height of the ribs 22c on the frame, and hence the lower ends of the ribs are spaced from the strip 16. Within the channel formed by the wall 16a, there is positioned a sealing gel 40, and the ribs 22c extend into the gel to ensure proper sealing. In a preferred form of the invention, the ribs only extend 1/16 of an inch and the channel is only ⅛ inch in depth, thereby minimizing the quantity of gel needed.

The sealing strips are formed with a plurality of spaced holes through which threaded fasteners 42 extend. Retainer plates 44 are supported on the upper ends of adjacent frame walls 22d. The retainers are shaped so that they can be inserted through the gap between adjacent panels, and can then be rotated 90° so that a longer dimension of the retainer will span the gap 24 between adjacent panels, as illustrated in FIG. 6. The fastener 42, threaded into the retainer 44, thus holds the strip in position. The strip is relatively lightweight, and the gel has an adhesive quality such that during installation, the strip will actually remain in place for a period of time while the fasteners 44 are being tightened. A quantity of gel may also be placed around the head of the fastener to prevent leakage in that area.

As noted above, there is also provided a sealing cap 18 located at the intersection of the panels. As seen from FIGS. 12–14, this cap encloses the support disk 28 and overlaps the ends of the sealing strips 16. The cap 18 is generally rectangular in shape and has upstanding walls 18a on each side which define a shallow rectangular channel for receiving the end of a sealing strip, and for sealing with the frame walls of the intersections. The cap walls 18 also form corners between adjacent channels. A triangularly shaped ledge or flange 48 extends between the exterior of adjacent cap walls 18a. Before a cap is placed into position, sealing gel 49 is placed in the cap so that the surfaces on the cap which mate with the sealing strips and the filter walls are coated with sealing gel when the cap is installed. A small threaded fastener 51 with gel around it extends through the center of the cap and threads into a small threaded socket 42a in the end of the fastener 30 which holds the support disk in place. One of the advantages of the present system is that the gel may be installed at the factory.

It should be noted that precise layout of holes in the filter panels combined with precise locking with pins in the disks results in uniform controlled lateral spacing between adjacent filter panels. Thus, the sealing strips will precisely span the spacing, and the outer legs 16a of sealing strip align vertically with the interior wall 22a of a filter frame and the inner legs 16b of the strips precisely align with the outer frame walls 22d.

The sealing strip walls 16a and 16b bear directly on the filter frame; and when attached with means 42 is uniformly spaced vertically throughout the grid. This permits usage of the very shallow gel trough. Because gel is expensive, the shallow trough not only represents far greater economy than known systems, but the shallow arrangement is structurally more stable then a deeper section, thus permitting greater control and uniformity of gel installation and maintenance in the trough of the sealing strip. This horizontal and vertical alignment and controlled spacing permit the sealing cap to effectively seal against air passage at the intersections.

Figure 12:
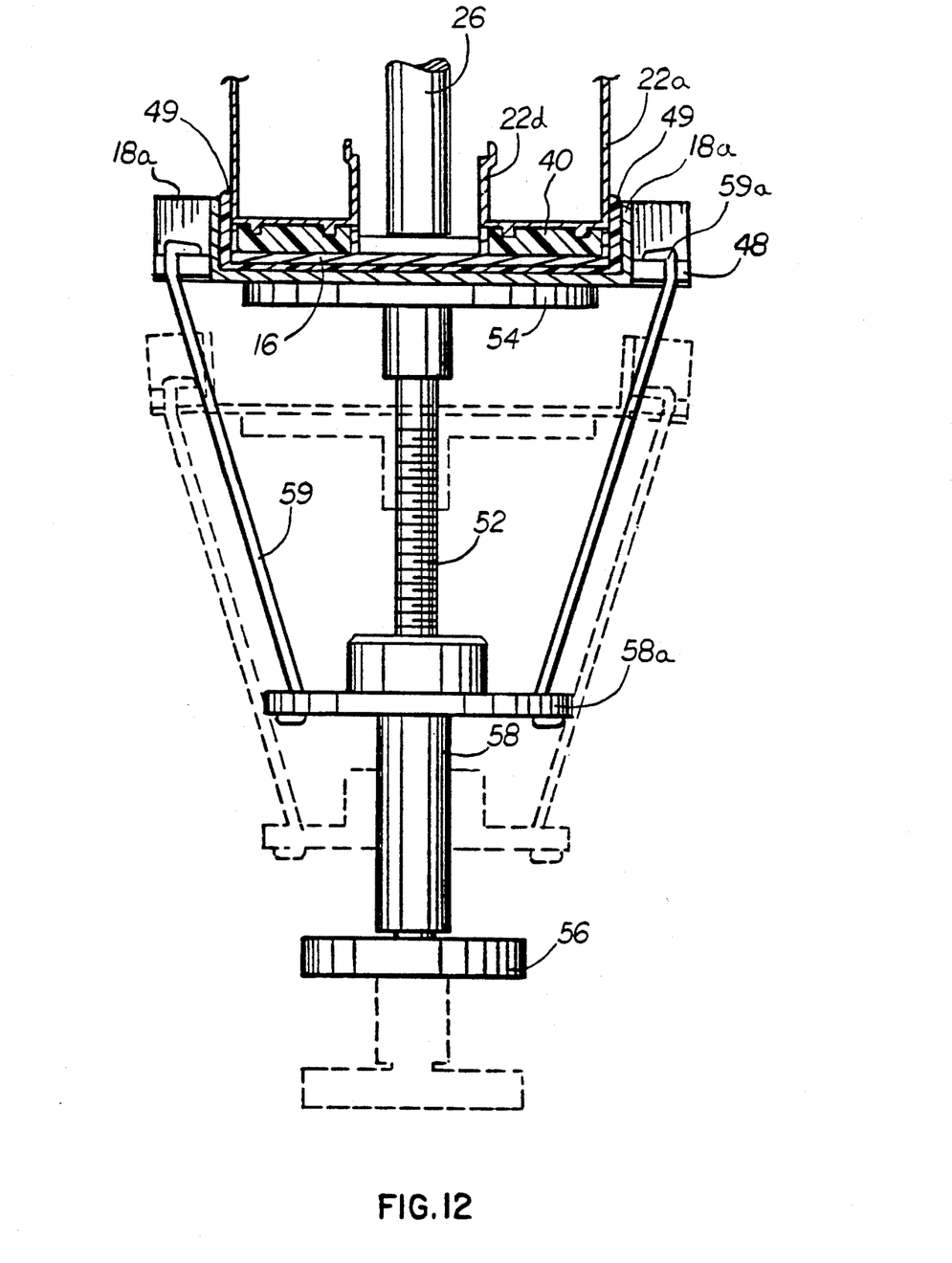
FIG. 12 is a cross-sectional view of the tool of FIG. 11, illustrating the manner in which the tool is used.
Figure 13:
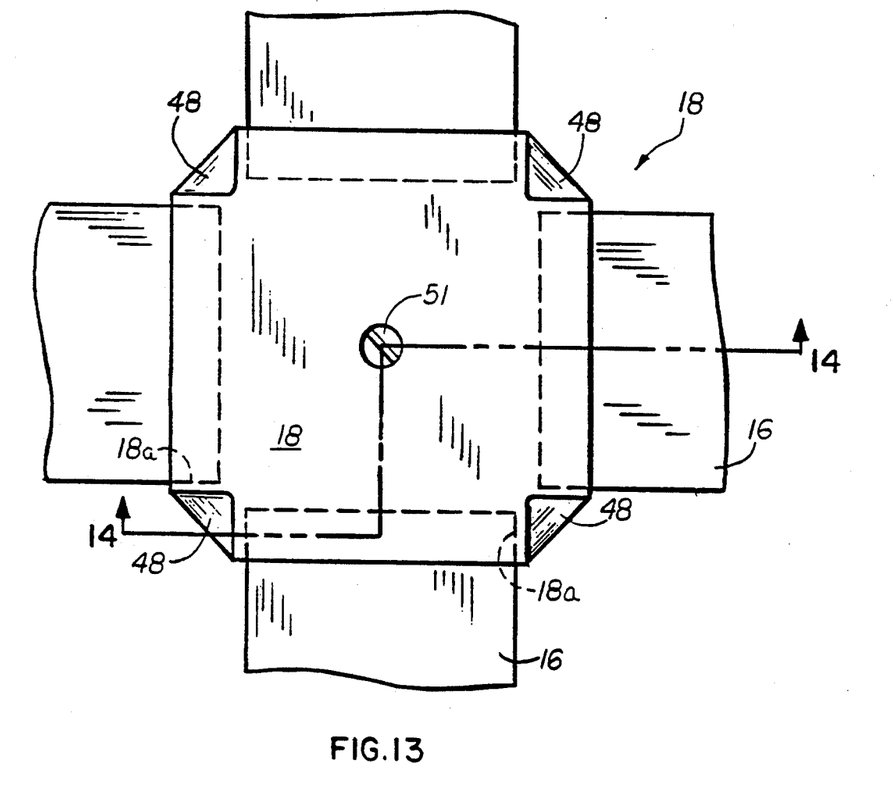
FIG. 13 is a plan view of a filter panel intersection after the sealing strips and sealing cap are installed.
Figure 14:
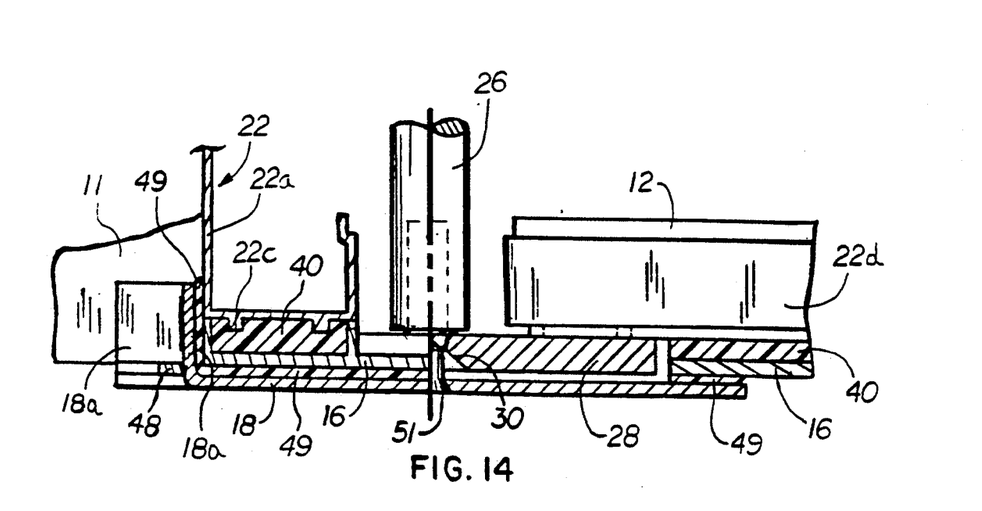
FIG. 14 is a view taken on line 14—14 of FIG. 13, further illustrating the nature of the construction at a panel intersection.

More specifically, note from FIGS. 12 and 14 that the cap walls 18a, although short, are longer than the strip trough walls 16a and 16b. Also, the upper ends of the cap walls 18a are aligned so that they compress sealing gel 49 against the frame walls 22a and the strip walls 16a to ensure sealing in that area.

A cap installation tool 50 illustrated in FIGS. 9–12 has a central adjustment shaft 52 with a support pad 54 mounted on one end and a disk-shaped grip 56 mounted on the other end. A sleeve 58 including a carrier disk 58a is threadably mounted on the shaft 52. Four fingers 59 are attached to the carrier disk 58a and extend toward the support pad, but are spaced outwardly from the pad. The outer end of each finger has an inwardly extending tip 59a that is adapted to engage a flange 48 on the cap 18.

Figures 9, 10, 11:
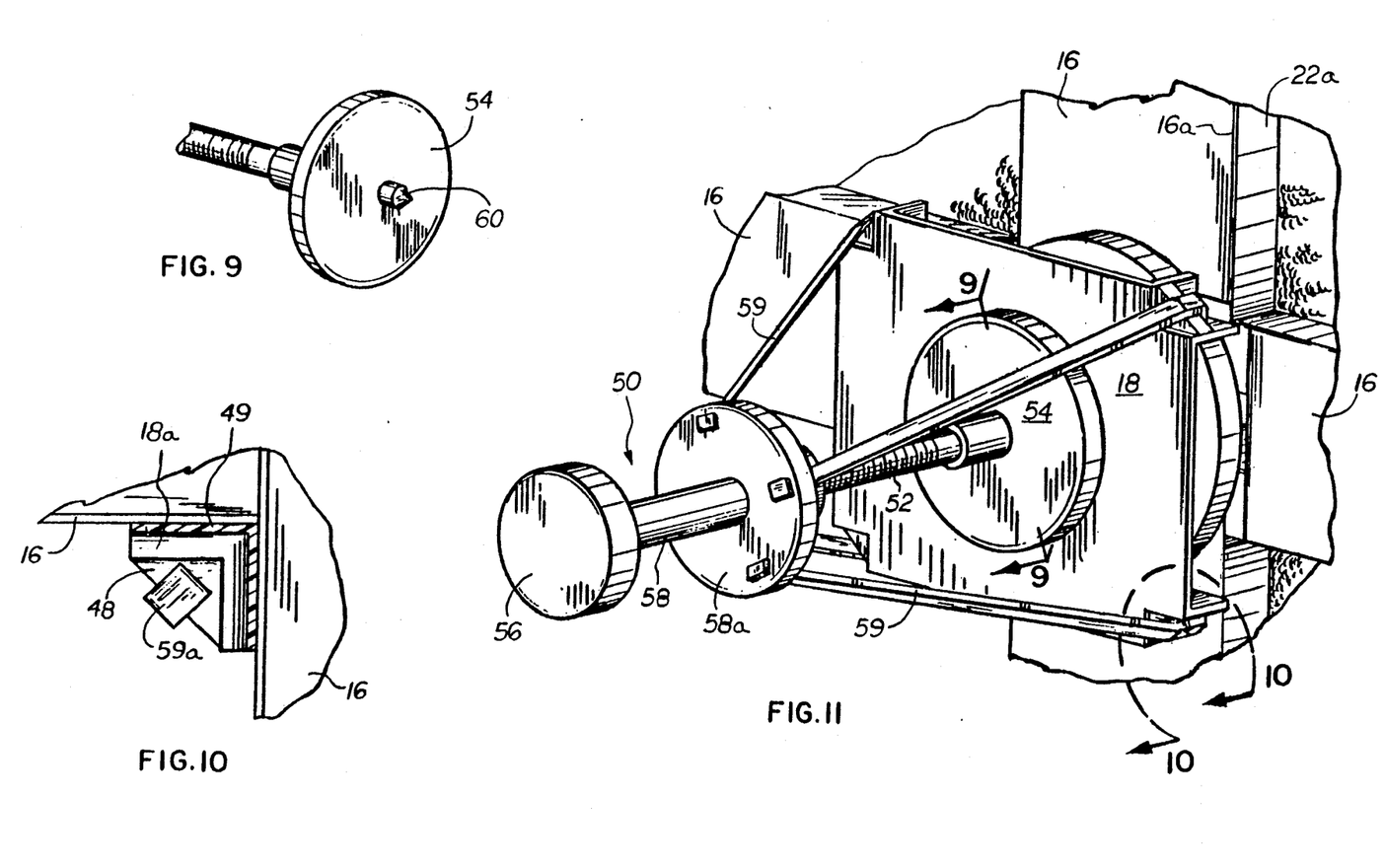
FIG. 9 is a perspective view of a portion of a tool for installing a cap over the support disk of FIG. 3, the view being generally taken along line 9—9 of FIG. 11.
FIG. 10 is a fragmentary view along line 10—10 of FIG. 11, illustrating the manner in which the tool finger cooperates with a portion of a disk covering cap.
FIG. 11 is a perspective view of a disk cap being installed with a special tool.

In use, the cap 18 is the last element of the assembly to be positioned. That is, after the panels have all been properly mounted on the support disks and the sealing strips, together with the sealing gel, have been properly positioned across the gaps between the panels, the caps 18 for the support disks are ready to be positioned. In doing that, a cap is positioned on the pad 54 of the tool in the position, approximately as illustrated in broken lines in FIG. 12. An alignment projection 60 extending outwardly from the support pad 54, as seen in FIG. 9, is positioned in a hole in the center of the cap 18. The tip 58a on the end of each finger 58 is positioned over the edge of the cap to engage the flange 48 axially. By rotating the shaft 52 with the disk-shaped handle while gripping the sleeve 58, the sleeve carrying the fingers is rotated, gently pulling on the flanges 48 to cause the cap flanges to be flexed downwardly slightly. This spreads the walls 18a of the channels on the cap slightly to enable them to be fit more easily over the ends of the sealing strips. The cap, carrying the necessary sealing gel 49, is carefully aligned beneath a supporting disk 28. The central point of the projection 60 on the tool pad 54 extends through the central hole in the cap and extends into the socket 42a in the screw 30 supporting the support member. With the cap properly positioned as shown in full lines in FIG. 12, the tool shaft can be rotated in the opposite direction to move the fingers toward the panels to relieve the spreading stress on the cap sidewalls, allowing them to move inwardly and lightly grip the ends of the sealing strips. After continued movement of the shaft in that loosening direction, the fingers of the tool can be spread enough to remove them from the cap and the tool withdrawn. The cap may remain in position unsupported in view of the slight resiliency of the cap legs against the sealing strips and in view of the adhesive quality of the gel. However, to further more securely position the cap beneath the support member, the screw 51, may be inserted through the central hole in the cap and threaded into the threaded socket 42a, with sealing gel sealing the interface between the screw and the cap hole.

The opposite procedure is utilized to remove the cap in the event access to the supporting disk is desired to replace a filter panel. That is, the screw 51 is removed, the tool is positioned on the cap as previously described and the cap legs are spread so that the cap can be easily withdrawn.

Figure 2:
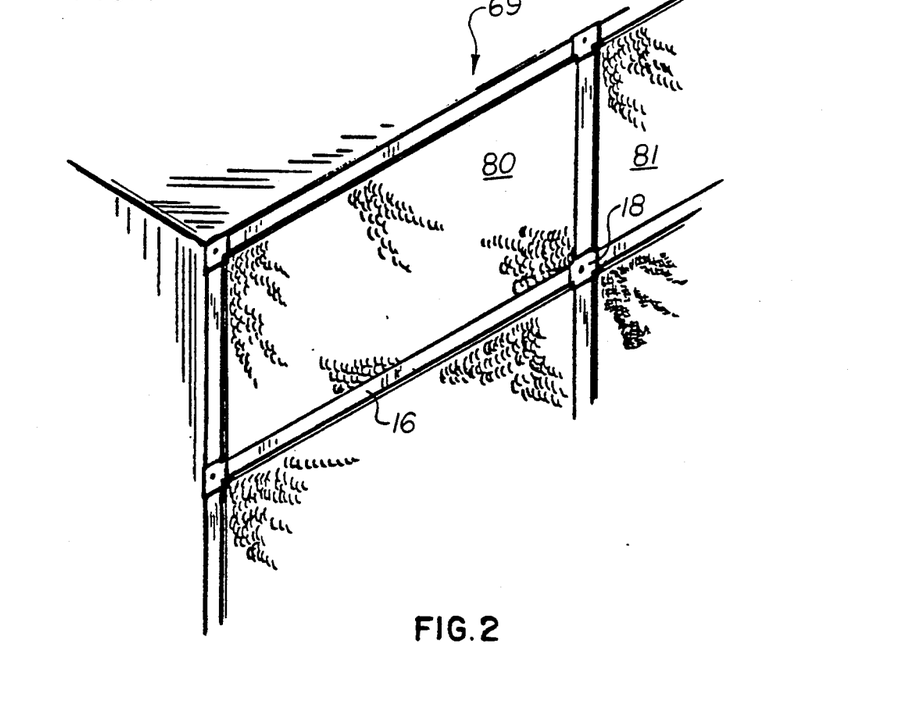
FIG. 2 is a perspective view of the filter arrangement of the invention forming a vertical wall.
Figure 7:
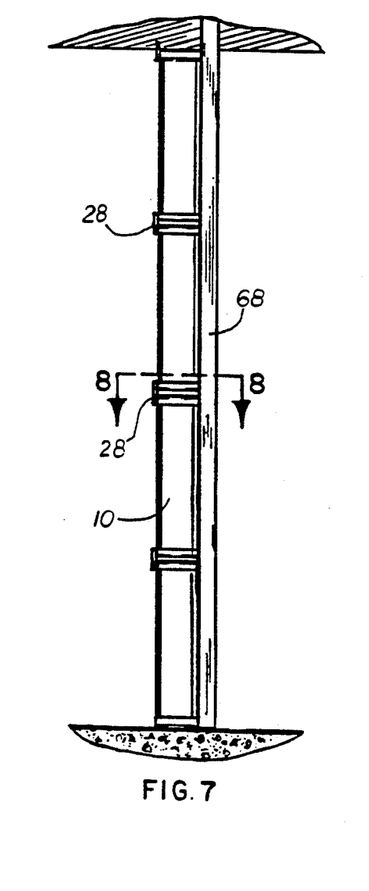
FIG. 7 is a side elevational view of the vertical wall of FIG. 2.
Figure 8:
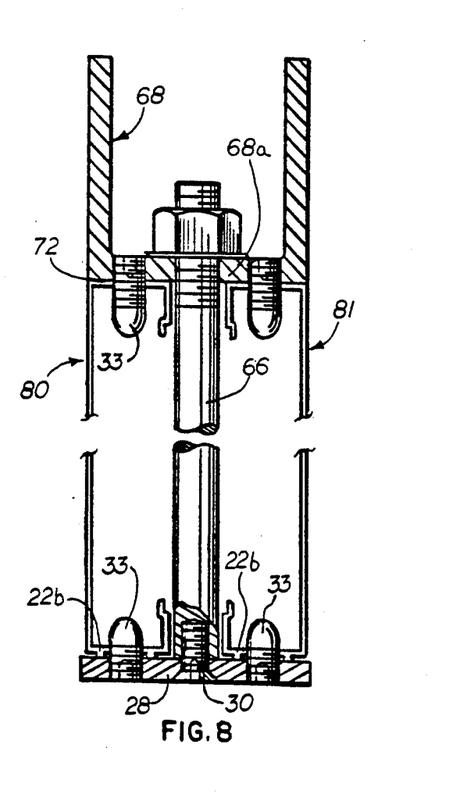
FIG. 8 is a cross-sectional view on line 8—8 of FIG. 7, illustrating the manner in which the panel support disks are mounted.

Turning now to the embodiment of the invention illustrated in FIGS. 2, 7 and 8, the supporting structure and the mounting procedure is similar to that described above. However, instead of support rods attached to a ceiling for positioning the panels, there is provided a similar elongated rod 66, as seen in FIG. 8, at each panel intersection. The rod 66 is mounted horizontally in a wall 68a of a vertical support channel 68. A plurality of such channels 68 are provided to support the filter panel wall 69. The channels are spaced to coincide with the panel intersections. Adjacent filter panels 80 and 81 are positioned by alignment pins 33 which extend through vertical support 68 and into a corner of each panel frame wall 72 at a particular panel intersection, as seen in FIG. 8.

On the clean room side of the panel wall, a supporting disk 28 is attached to the end of the support end by a suitable threaded fastener 30, which threads into the rod 66. Note that the rod mounting in the channel 68 is adjustable to fit the filter thickness. After the panels are installed, support disks 28 with alignment pins 33 are installed into the support panels in the same manner as described above in connection with the overhead filter assembly. Likewise, suitable sealing strips 16 and sealing caps 18 are positioned over the joints between adjacent panels.

The system described advantageously provides great precision and ease of installation. The panels may be accurately formed and assembled in the factory, with the corner alignment holes being precisely located in the rigid frame of a panel. Also, positioning sealing gel in the sealing strips and caps, in the factory is an accurate and efficient procedure that facilitates the installation of the panels and insures a properly sealed finished filter wall. Because of the precise nature of the system the sealing strip gel channels can be made shallow, thereby minimizing the amount of gel needed.

This system creates a diaphragm so that the entire ceiling acts as unit. Also, precise positioning permits control of cumulative tolerance factors and ± dimensions of the total grid can be determined in advance. To gain acceptance as a system, it is important to recognize that an air impervious ceiling can only be obtained if there are no weak links. Also this system has control of total sealing capability built into the system rather than depending upon the expertise of installers in the field.

It is claimed:

1. A filter panel system wherein filter panels cover the walls or ceiling of a room, the walls or ceiling being an underlying surface, said system comprising:
   a plurality of filter panels suspended against gravity at a predetermined distance from said underlying surface, the distance defining a gap between the filter panels and the underlying surface, the filter panels arranged adjacent to each other in closely spaced edge-to-edge relation such that the filter panels have adjacent edges, each filter panel having an integral rigid frame with a corner, wherein the corners of said adjacent panels meet to form an intersection, the gap between the filter panels and the underlying surface substantially free from obstruction to allow free communication of air within the gap;

a support rod having an end extending into the intersection generally perpendicular to said panels;

a support member attached to said rod to engage and support the panels, the filter panels retained against gravity substantially only by the support member; and at least one air impervious sealing strip joining the adjacent edges of the filter panels, the sealing strip coupled only to the panels and free from any coupling to the underlying surface.

2. The system of claim 1, wherein said panels are generally horizontally oriented, said rod is vertically oriented and said support member is attached to a lower end of said rod and extends beneath the panel corners.

3. The system of claim 1, including a plurality of alignment elements interconnecting the corners of said adjacent panels at said intersection to said support member to position said panels relative to each other.

4. The system of claim 3, wherein said alignment elements are pins which are precisely positioned with respect to said support member and the corners of said adjacent panels to prevent edgewise movement of said panels with respect to each other.

5. The system of claim 4, wherein each of said pins extends through said support member and into an alignment hole in a respective corner of one of said adjacent panels.

6. The system of claim 1, wherein the air impervious sealing strip has an end adjacent the support member, the sealing strip covering the adjacent edges of adjacent panels to prevent the passage of air between the adjacent edges of adjacent panels.

7. The system of claim 6, wherein said sealing strip has at least two elongated edges and a pair of short upstanding walls on each elongated edge of the strip to form an upwardly facing shallow channel on each elongated edge of said strip for receiving sealing gel, said channels being located to receive ribs projecting from the frame of adjacent panels.

8. The system of claim 7, wherein said upstanding walls are vertically longer than said ribs so that the ribs do not actually engage the sealing strip, but instead may be embedded in sealing gel in the channels to further enhance the air sealing effect.

9. The system of claim 1, wherein said plurality of panels form a plurality of intersections, and a plurality of said support rods are provided with a rod being located at each of said intersections, and a plurality of said support members being provided, with one such support member being located on the end of each of said rods to support the panel corners at each of said intersections.

10. The system of claim 9, wherein said panels are sufficiently rigid such that a panel is adequately supported by means of one of said support members at each of the corners of a particular panel.

11. The system of claim 1, wherein the sealing strip extends along adjacent edges of said adjacent panels to prevent airflow between the adjacent edges.

12. The system of claim 11, wherein each of said panels includes a frame having depending ribs which are adapted to fit within sealing gel positioned between said ribs and said sealing strip.

13. The support system of claim 1, wherein said panels are arranged to form a generally vertically oriented wall, said wall having an interior side and an exterior side, said support member engages the interior side of said corners.

14. The support system of claim 13, including a plurality of alignment pins with one pin extending through each of said corners and into said support member to fix the edge-to-edge relationship of said panels.

15. A filter panel system, comprising:

a plurality of filter panels arranged adjacent to each other in a close spaced edge-to-edge relation such that the filter panels have adjacent edges, each filter panel having a rigid frame with a corner, wherein the corners of said adjacent panels meet to form an intersection;

a support rod having an end extending into the intersection generally perpendicular to said panels;

a support member attached to said rod to engage and support the panels;

wherein said panels are generally horizontally oriented, said rod is vertically oriented and said support member is attached to a lower end of said rod and extends beneath the panel corners; and wherein said support member is rotatably mounted on said rod and includes a cutout section shaped and located to permit a corner of a single panel to fit through it so that with said support member in a panel install or remove position, said single panel can be moved vertically with respect to said member to permit the installation or removal of said single panel, and said rotatable support member having a support position wherein a portion of said support member extends beneath and supports the corner of said single panel at said intersection.

16. The system of claim 15, wherein said support member is in the form of a generally flat disk having a pie-shaped section with said pie-shaped section approximately the same shape and size as the corner of said single panel.

17. The system of claim 16, including plurality of alignment elements connecting the corners of said adjacent panels at said intersection to said support member to position said panels relative to each other.

18. The system of claim 15, including a fastener which extends through the center of said support member and has a fastener upper end threaded into the lower end of said rod, said fastener having a head on a fastener lower end which is larger than a hole through said support member so that the support member is secured to the rod by said fastener, said fastener lower end formed to permit rotation of the support member of said fastener.

19. A filter panel system, comprising:

a plurality of filter panels arranged adjacent to each other in closely spaced edge-to-edge relation such that the filter panels have adjacent edges, each panel having a rigid frame with a corner, wherein the corners of said adjacent panels meet to form an intersection;

a support rod having an end extending into the intersection generally perpendicular to said panels, a support member attached to said rod to engage and support the panels; and wherein said support member is in the form of a rotatable disk having a notch which has the shape of the corner of one of said panels and said disk is rotatable between an open position wherein said notch is aligned with the corner of one of said panels to permit the panel to be moved through the support member, thereby permitting the installation or removal of that panel, said support member further having a closed position wherein a portion of said disk cooperates with the corner of one of said panels at intersection to support the panel.

20. A filter panel system, comprising:
a plurality of filter panels arranged adjacent to each other in close spaced edge-to-edge relation such that the filter panels have adjacent edges, each panel having a rigid frame with a corner, wherein the corners of said adjacent panels meet to form an intersection;
a support rod having an end extending into the intersection generally perpendicular to said panels;
a support member attached to said rod to engage the panels;
a sealing strip having an end adjacent the support member, the sealing strip covering the adjacent edges of adjacent panels to prevent the passage of air between the adjacent edges of adjacent panels; and
a sealing cap covering the support member and overlapping onto the end of said sealing strip at said intersection to prevent the passage of air between adjacent panels at said intersection.

21. The system of claim 20, including sealing gel positioned between said sealing strip and said panel and between said cap and an end of said strip.

22. The system of claim 21, wherein said panels each have one or more ribs that project into said gel to prevent air from passing between the adjacent edges of said panels.

23. The system of claim 20, wherein said sealing cap includes upstanding cap walls adapted to fit onto the end of said sealing strip and adapted to receive sealing gel to help seal the interface between said cap and the end of said strip.

24. The system of claim 23, wherein said sealing cap includes generally horizontally extending flanges that extend between said cap walls, said cap being sufficiently flexible such that said cap walls can be spread to fit over an end of said sealing strip.

25. A filter panel system, comprising:
a plurality of filter panels arranged adjacent to each other in closely spaced edge-to-edge relation such that the filter panels have adjacent edges, each panel having a rigid frame with a corner, wherein the corners of said adjacent panels meet to form an intersection;
a support rod having an end extending into the intersection generally perpendicular to said panels;
a support member attached to an end of said rod to engage and support the panels;
a plurality of elongated sealing strips extending along the adjacent edges of each of said panels, wherein said sealing strips are supported by said panels; and
a plurality of spaced fasteners that support said sealing strips and fit within retainers supported on the adjacent edges of adjacent panels.

26. The system of claim 25, wherein said retainers straddle a gap between adjacent panels.

27. The system of claim 26, wherein said retainers are dimensioned so as to fit through said gap in one orientation but are rotatable to a second orientation wherein said retainers span the gap.

28. A filter panel system, comprising:
a plurality of filter panels arranged adjacent to each other in closely spaced edge-to-edge relation such that the filter panels have adjacent edges, each panel having a rigid frame with a corner, wherein the corners of said adjacent panels meet to form an intersection;
a support rod having an end extending into the intersection generally perpendicular to said panels;
a support member attached to an end of said rod to engage and support the panels;
a plurality of alignment pins, with one pin extending through each of said corners and into said support member to fix the edge-to-edge relationship of said panels;
wherein said panels are arranged to form a generally vertically oriented wall, said wall having an interior side and an exterior side, said support member engaging the interior side of said corners; and
wherein said support member is in the form of a disk which is rotatably mounted on said rod, said disk includes a notch which is shaped and located to a fit a corner of said panels so as to permit a panel to be inserted into or removed from said wall.

29. The system of claim 28, further including a sealing strip located between said adjacent panels, and including sealing gel extending between said strip and said panels to further enhance the seal.

30. The system of claim 29, further including a sealing cap which sealingly fits over said disk and an end of said sealing strip.

31. A filter panel system wherein the filter panels cover the walls or ceiling of a room, the walls or ceiling being an underlying surface, said system comprising:
a plurality of filter panels suspended against gravity from said underlying surface, the filter panels supported adjacent to each other in closely and precisely spaced edge-to-edge relation, each panel having a rigid frame having a length, the frame having one or more depending ribs extending along the length of the frame, the frame having a corner, wherein the corners of said adjacent panels meet to form an intersection, and said system including additional adjacent panels to form additional intersections;
a sealing strip spanning the space between said adjacent panels covering the adjacent edges of panels, the sealing strip having an end limiting the extent of the strip, said sealing strip having at least two elongated edges and a pair of short upstanding walls on each elongated edge of the strip to engage said frames and to form upwardly facing shallow channels on each elongated edge of said strip, said channels receiving sealing gel, said channels being located to receive said ribs projecting into the gel;
a support member joining adjacent filter panels at each of the intersections; and
a connecting member connecting the support member at each of the intersections to the underlying surface, each of said connecting members being independent of the other connecting members;
said panels being suspended from the underlying surface only by means of one of the support members at each of the intersections in conjunction with the connecting members.

32. The system of claim 31, wherein said upstanding walls are vertically longer than said ribs so that the ribs do not actually engage the sealing strip, but instead the ribs are embedded in sealing gel in the channels to provide air sealing.

33. A filter panel system, comprising:
a pair of filter panels supported adjacent to each other in closely and precisely spaced edge-to-edge relation, each panel having a rigid frame having a length, the frame having one or more depending ribs extending along the length of the frame;
a sealing strip spanning the space between said panels covering the adjacent edges of panels, the sealing strip having an end limiting the extent of the strip, said sealing strip having at least two elongated edges and a pair of short upstanding walls on each elongated edge of the strip to engage said frames and to form upwardly facing shallow channels on each elongated edge of said strip, said channels receiving sealing gel, said channels being located to receive said ribs projecting into the gel;
wherein said upstanding walls are vertically longer than said ribs so that the ribs do not actually engage the sealing strips, but instead the ribs are embedded in sealing gel in the channel to provide air sealing; and
a plurality of spaced fasteners that support said sealing strip and fit within retainers supported on said panels.

34. A filter panel system, comprising:
a pair of filter panels supported adjacent to each other in closely and precisely spaced edge-to-edge relation, each panel having a rigid frame having a length, the frame having one or more depending ribs extending along the length of the frame;
a sealing strip spanning the space between said panels covering the adjacent edges of panels, the sealing strip having an end limiting the extent of the strip, said sealing strip having at least two elongated edges and a pair of short upstanding walls on each elongated edge of the strip to engage said frames and to form upwardly facing shallow channels on each elongated of the strip, said channels receiving sealing gel, said channels being located to receive said ribs projecting into said gel;
wherein said upstanding walls are vertically longer than said ribs so that the ribs do not actually engage the sealing strip, but instead the ribs are embedded in sealing gel in the channel to provide air sealing; and
a sealing cap having upstanding walls fitting onto the end of said sealing strip and one or more additional strips at a panel intersection, said cap adapted to receive sealing gel to seal the interface between said cap and the end of said strip.

35. The system of claim 34, wherein each said frame includes an outer vertical wall and an inwardly spaced inner vertical wall, with said vertical walls straddling said one or more ribs, an outer one of said sealing strip walls being vertically aligned with said frame inner vertical wall.

36. A filter panel system, comprising:
a plurality of filter panels supported adjacent to each other in closely and precisely spaced edge-to-edge relation, each panel having a rigid frame with an outer vertical wall and an inwardly spaced inner vertical wall, said panels having corners which meet in closely spaced relation at corner intersections;
a plurality of sealing strips each spanning the space between each adjacent pair of said panels with the strips terminating slightly spaced from each other at said intersection, each of said strips having a short upstanding wall on its two longitudinal edges, each upstanding wall being aligned with a respective one of said frame inner vertical walls, said sealing strip supporting a sealing medium between the strips and the panels; and
a sealing cap fitting over said intersection, said cap having upstanding walls defining channels spaced to fit closely over the ends of said strips, said cap walls also form corner walls between adjacent channels, and said cap walls being taller than said strip walls so that the cap walls fit onto said frame inner walls adjacent the ends of said strips to seal all air gaps, together with a sealing medium compressed between the cap walls and the ends of the strip walls and the inner frame walls.

37. A sealing cap for use in connection with sealing the intersection formed by corners of adjacent overhead panels, said cap having a generally square configuration with a pair of upstanding walls on each side of the cap forming generally flat rectangular channels for receiving the ends of sealing strips, said cap including a flange at each corner of said cap extending between adjacent channel walls, said channel being made of somewhat flexible material with substantial memory, such that the channel walls can be spread slightly by applying a downward force on said flanges with a reacting force being applied to the lower surface of said cap at a location spaced inwardly from said cap corners.

38. A filter panel system comprising:
a plurality of filter panels hanging from a ceiling, the filter panels having corners arranged adjacent one another to define an intersection where a plurality of respective corners meet;
a support joining said adjacent corners at said intersection, and extending beneath said adjacent corners at said intersection;
a connecting member connecting said support at said intersection to said ceiling at a predetermined distance to define an airspace between said filter panels and said ceiling; and
at least one air impervious sealing strip joining an adjacent pair of filter panels, the sealing strip being coupled only to the panels and free from any coupling to the ceiling;
said sealing strip having at least two elongated edges and a pair of short upstanding walls on each said edge of said strip to form upwardly facing shallow channels on each said edges of said strip, said channels receiving sealing gel to create an air impervious seal between said sealing strip and said panels.

* * * * *